No. 619,672. Patented Feb. 14, 1899.
C. A. CHEVALIER & N. G. VASSEUR.
GEAR CASE.
(Application filed June 23, 1898.)
(No Model.) 2 Sheets—Sheet 2.
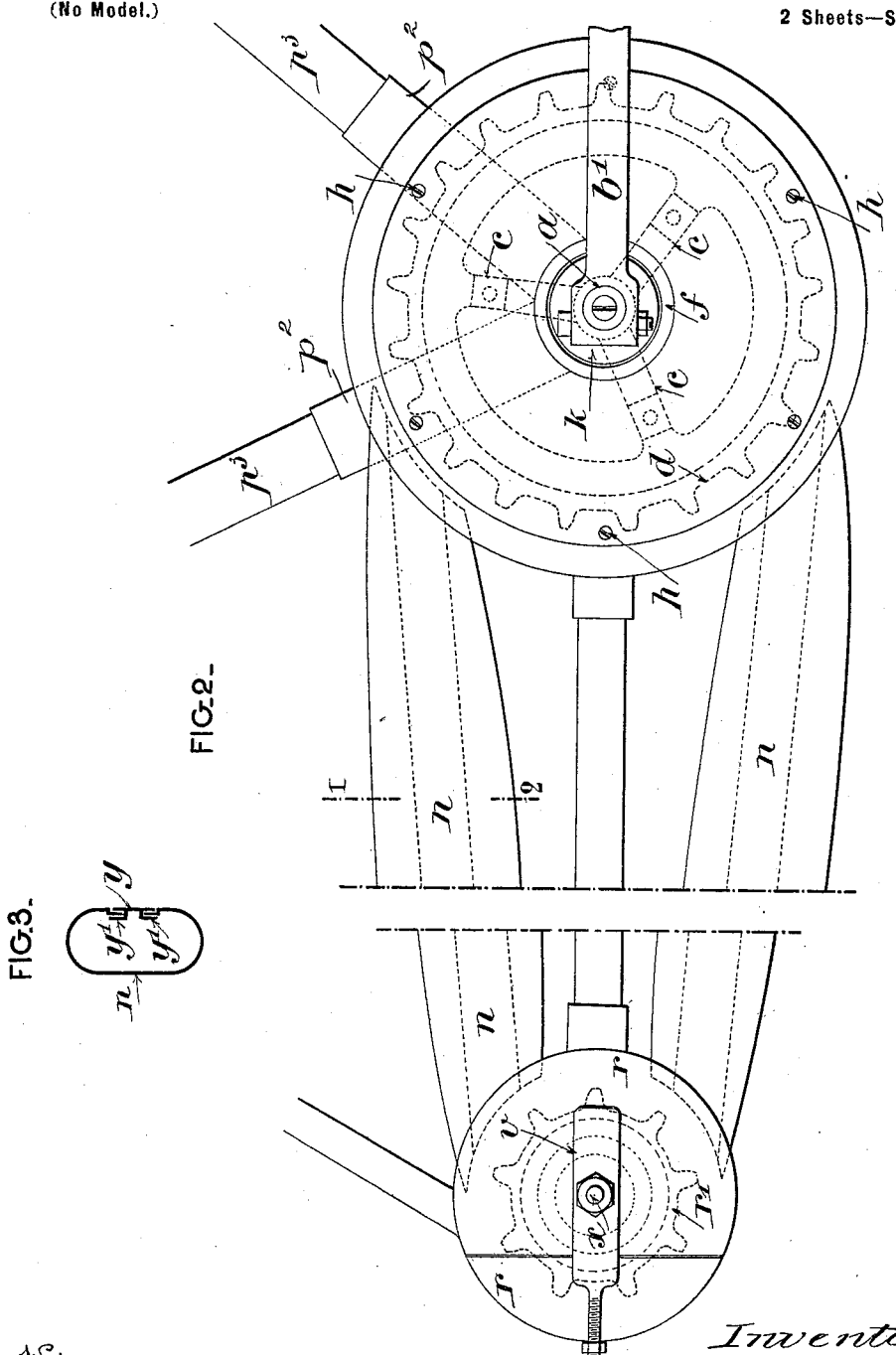

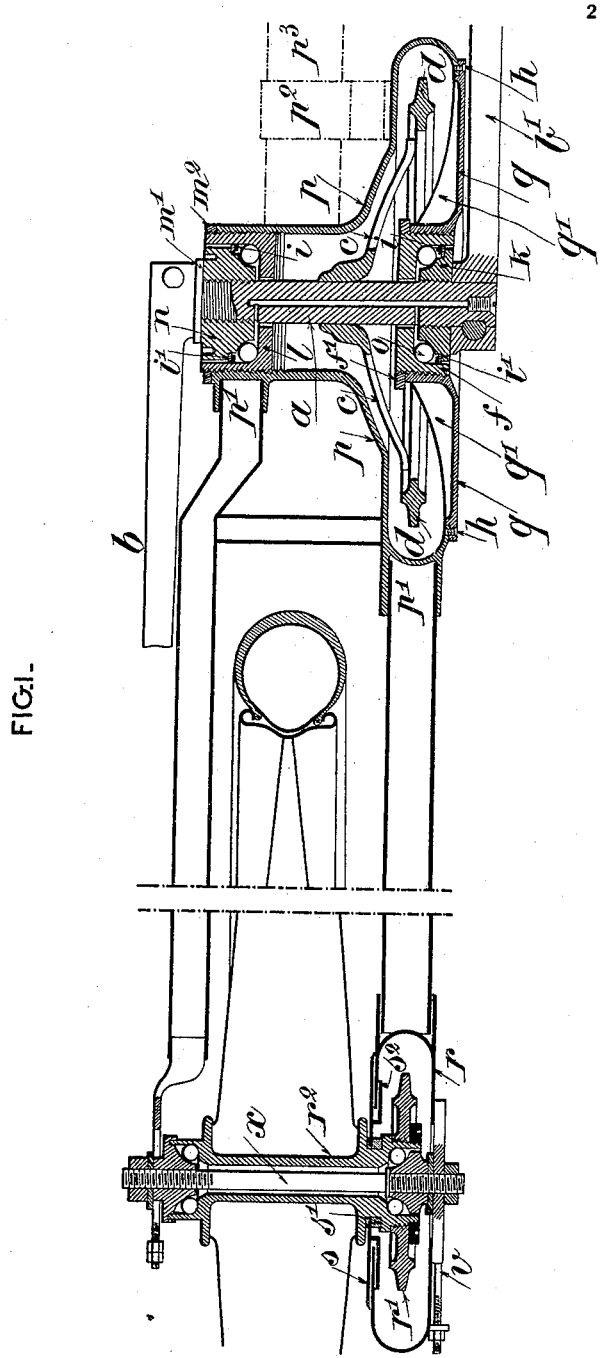

UNITED STATES PATENT OFFICE.

CONSTANT ALPHONSE CHEVALIER AND NORBERT GUSTAVE VASSEUR, OF CAEN, FRANCE.

GEAR-CASE.

SPECIFICATION forming part of Letters Patent No. 619,672, dated February 14, 1899.

Application filed June 23, 1898. Serial No. 684,271. (No model.)

*To all whom it may concern:*

Be it known that we, CONSTANT ALPHONSE CHEVALIER and NORBERT GUSTAVE VASSEUR, mechanical engineers, of Caen, Calvados Department, in the Republic of France, have invented certain new and useful Improvements in and Relating to Velocipedes, of which the following is a specification.

Our invention relates to a novel form of driving or crank axle for velocipedes in combination with a gear-case or chain-cover which is hermetically closed, but detachable.

The essential characteristic of our novel construction is that it allows of the chain-wheel being fixedly attached to the crank-axle between the ball-bearings while still maintaining the said axle in one piece and fixing on its ends, as usual, the two cranks, thereby securing a normal tractive action of the chain, preventing all twisting motion and increasing the rigidity of the machine. Particular arrangements for mounting and fitting the ball-bearings, combined with a novel system for lubricating the different parts, complete the improvements.

Reference is to be had to the accompanying drawings, in which—

Figure 1 is a horizontal section through the crank-axle and through the axle of the rear wheel. Fig. 2 is a perspective side view, and Fig. 3 is a sectional view of a gear-case on the line 1 2 of Fig. 2.

The crank-axle $a$, on the ends of which are fixedly attached the cranks $b$ and $b'$, carries inwardly-curved arms $c$, integral with or fixedly attached to the said crank-axle, at or near its middle part, a toothed and detachable disk, forming the chain-wheel $d$, being fixed to the said arms $c$.

Between the chain-wheel $d$ and the crank at the same side is placed one of the ball-bearings. The other ball-bearing is placed near the other crank. One of the said bearings is mounted in the crank-axle socket and the other bearing is mounted in its case or cover.

The fixed part of the socket of the crank-axle is of absolutely novel form. It is composed of the "box," properly so called, $p$, of the said axle in spun sheet-steel, which serves as a direct support for the ball-bearing placed on the opposite side of the chain-wheel. The said fixed part is also composed of a case or cover $g$, in spun sheet-steel and which closes the said box $p$, on which it is fixed by means of screws $h$. The said cover $g$ serves as a support for the second ball-bearing and is slightly curved inward at its center and toward the interior of the box to give clearance to the hub of the crank, which can thus be brought nearer. Ribs $g'$, arranged to the right of the screws $h$, serve to strengthen the cover.

In the central spun part of the cover $g$ is screwed and backed by a nut $f'$ a cup $f$, having a semicircular groove, forming one of the ball-races $o$ of the ball-bearing. Registering with $o$ is a cone $k$, screwed on the crank-axle $a$ and forming the second ball-race. In the said cup is soldered an annular plate $i$, with which comes in frictional contact the straight part of the cone $k$, with the interposition of a felt washer $i'$, whereby to keep in the interior of the cup the lubricating-oil fed through the central duct $a'$ of the axle $a$ and to prevent the entry of any dust. The second ball-bearing rests on the "box," properly so called, of the crank shaft or axle. It comprises, as before, a cup $l$, screwed into the said box, a cone $n$, forming the second ball-race, screwed onto the crank-axle $a$ and held in place by the nut $m'$. A ring $m^2$, acting as a stop-nut, fits onto the cup $l$ at its end. By acting on this end and on the cone $k$ and the stop-nut $m^3$ the ball-races may be regulated. A felt packing $i'$ is provided for this ball-bearing, as in the former case and for the same purpose. The crank-axle may be regulated by means of either the cone $n$ or the cup $l$.

On a tube on the periphery of the box $p$ are brazed the branches $p'$ of the horizontal fork of the frame of the machine, while sockets $p^2$ hold the box of the crank-axle on the oblique tubes $p^3$ of the said frame. Finally the box $p$ is provided with two openings, giving clearance to the chain and in which come and fit two chain cases or covers $n$ $n$, slightly curved inward and which protect the chain and also prevent dust from penetrating into the said box $p$.

Each chain cover or case is provided at its inner side with a longitudinal opening the two edges of which are slightly inclined toward the inside, so that the metal strip $y$ of the sliding door closing the said cover or case does not in any way project above the surface of the same, other square strips $y'$, soldered to the inner side of the sliding door, providing a means for fixing the latter. The above arrangement leaves no part in projection on the surface of the cover or cases and prevents any play or clearance through which dust might penetrate at the points where the said covers or cases enter into the box of the crank-axle and are connected with the box which encircles the driving-wheel.

The box $r$, of spun sheet metal, which encircles the pinion $r'$, fixedly attached to the hub $r^2$ of the driving-wheel, is brazed onto the tubes of the frame of the machine by means of suitable hollow connections. On the inner side of the box $r$ a sheet metal or tin plate $s$ encircles the rotary hub, in combination with a leather washer $s'$, the two pieces coming together. At its inner part the plate $s$ is connected by soldering, for example, to a second annular piece $s^2$, square in cross-section. It will thus be seen that the edges of the box $r$ are capable of sliding between the plates $s$ and $s'$, dust being unable to penetrate on account of the double joint due to the superposition of the said plates. The front face of the box $r$ is slotted to permit of moving the axle $x$ of the wheel when regulating the tension of the chain, but the slotted part is closed by the cross-piece $v$, mounted on the axle $x$.

The several parts of our driving-gear are so combined with the chain-case and with the box of the rear hub that dust cannot come and soil them. If required, the chain can be easily cleaned, access to the same being readily obtained by sliding the doors $y$ on the covers or cases, hermetically closing the same. The spring-strips $y'$ are put in place by engaging the ribs in an inclined opening, the hermetic joint being made by the pressure of the spring-strips $y'$ against the wall of the cover or case.

We claim—

1. A driving-gear for velocipedes and the like, comprising a crank-axle formed in one piece, cranks secured to the ends of the axle, curved arms extending from the crank-axle at or near the middle thereof, a chain-wheel secured to the said arms, a box or casing having a socket portion at one end forming a support for the bearings at said end of the axle, the said box or casing having an enlarged portion at its other end encircling the chain-wheel, and a cover for the box or casing having an inwardly-extending central hub, encircling the other end of the axle, the said central hub extending within the chain-wheel and serving as a support for the bearings at said end of the axle, the bearings being arranged at the center of the chain-wheel and encircled by said wheel, substantially as shown and described.

2. A driving-gear for velocipedes, comprising a crank-axle, inwardly-curved arms extending from the crank-axle at or near the middle thereof a chain-wheel detachably secured to the said arms, a box or casing having a socket forming a support for the ball-bearing at one end of the axle the said box or casing having an enlarged portion encircling the chain-wheel, and a cover for the box or casing provided with strengthening-ribs and having an inwardly-extending central hub encircling the other end of the axle the said hub extending within the chain-wheel and serving as a support for the bearings at said end of the axle, the said bearings being arranged at the center of the chain-wheel and encircled by said wheel, a driven axle, a chain-wheel secured thereto in line with the chain-wheel on the crank-axle, a box encircling the chain-wheel on the driven axle, chain-cases passed between the boxes, and a chain run over the wheels and passed through the chain-cases, substantially as set forth.

3. In a driving-gear for velocipedes and the like, the combination with the frame of the machine, the gear case or box covering the sprocket-wheel on the crank-axle, and the chain covers or cases connected with the said box, of the gear case or box arranged to inclose the sprocket-wheel on the hub of the rear wheel and connected with the frame of the machine and with the said chain-covers, a plate encircling the hub of the rear wheel and located on the inner side of the said box or casing to close the opening in the same, a washer encircling the hub and engaging the said plate, a second annular plate connected with the first plate at its inner portion, the edges of the box or casing sliding between the said plates, the said gear casing or box having its front face slotted to permit of moving the axle to regulate the adjustment of the chain, and an adjustable cross-piece mounted on the axle for closing said slot, substantially as shown and described.

Signed at Havre, in the Republic of France, this 10th day of June, 1898.

CONSTANT ALPHONSE CHEVALIER.
NORBERT GUSTAVE VASSEUR.

Witnesses:
JOHN PRESTON BEECHER,
E. MILLER.